Figure 1:
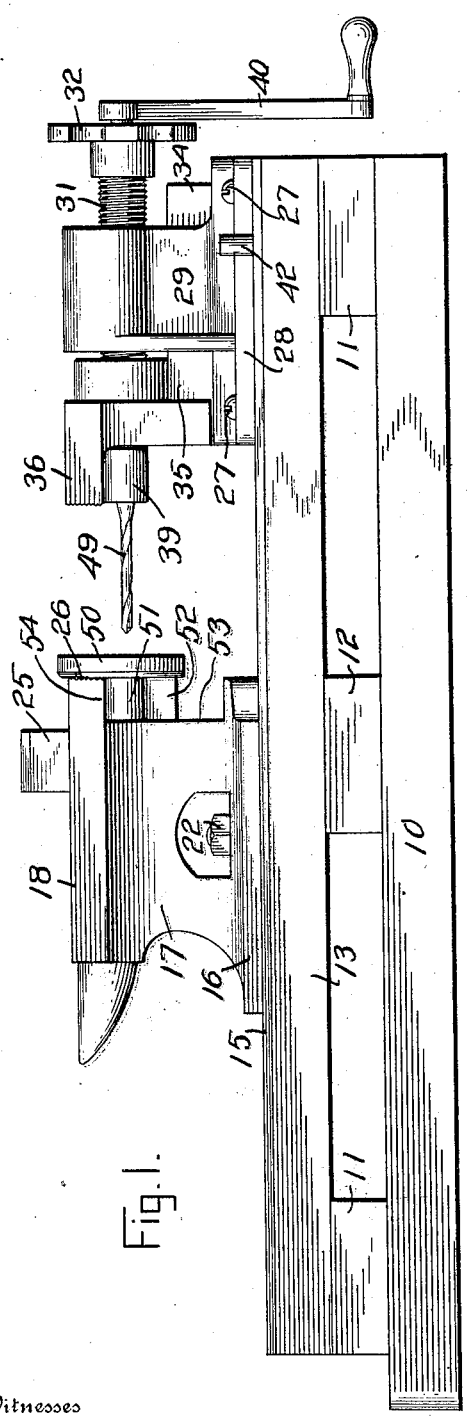

No. 895,953. PATENTED AUG. 11, 1908.
C. BREWER.
COMBINED ANVIL, VISE, AND DRILL.
APPLICATION FILED SEPT. 16, 1907.

3 SHEETS—SHEET 1.

Witnesses
Inventor
C. Brewer
By
Attorneys

No. 895,953. PATENTED AUG. 11, 1908.
C. BREWER.
COMBINED ANVIL, VISE, AND DRILL.
APPLICATION FILED SEPT. 16, 1907.
3 SHEETS—SHEET 2.
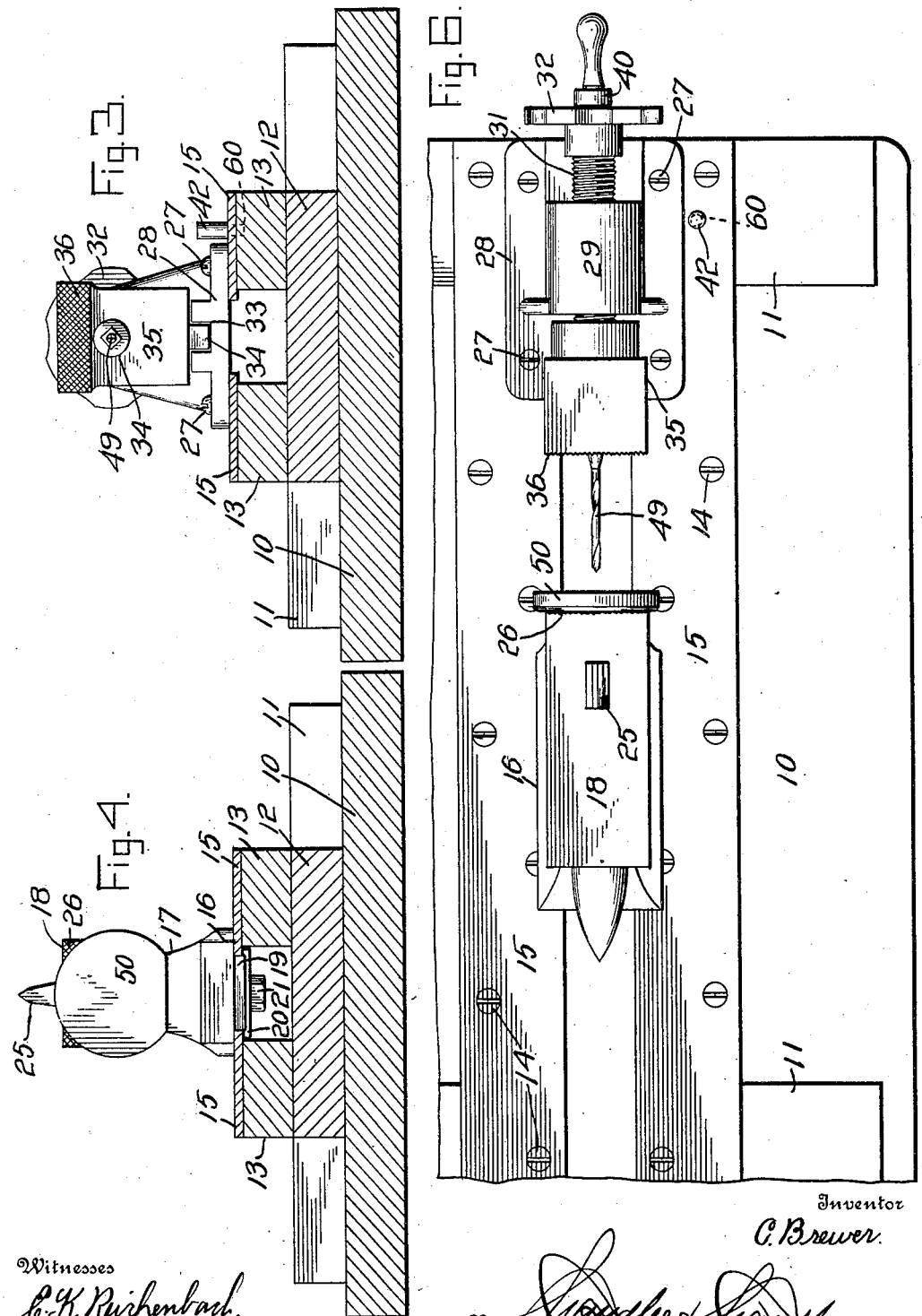
Witnesses
C. K. Reichenbach.
J. L. Miller.
Inventor
C. Brewer.
By Chandlee & Chandlee
Attorneys.

No. 895,953. PATENTED AUG. 11, 1908.
C. BREWER.
COMBINED ANVIL, VISE, AND DRILL.
APPLICATION FILED SEPT. 16, 1907.
3 SHEETS—SHEET 3.
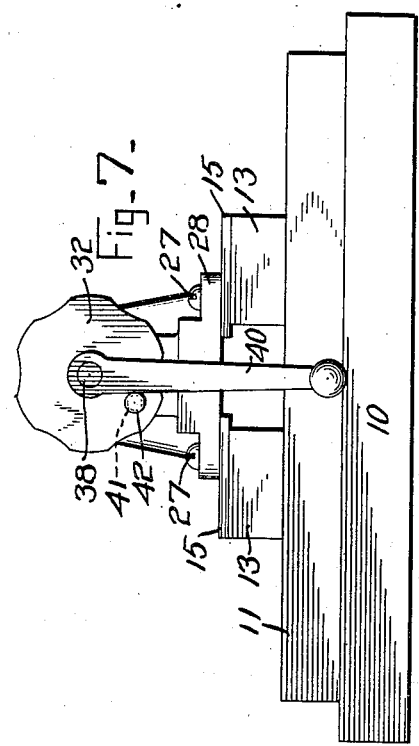
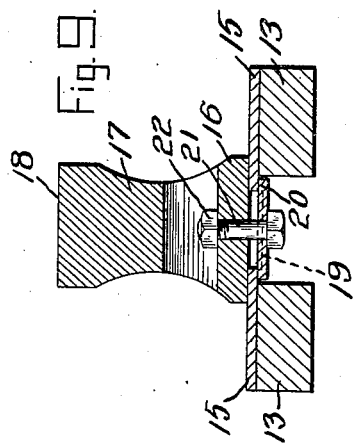
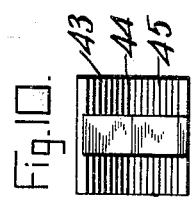
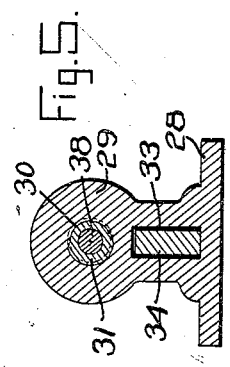
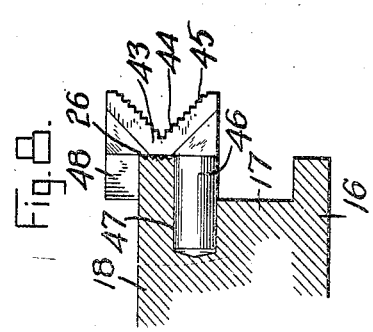
Witnesses
E. K. Reichenbach.
J. C. Miller.
Inventor
C. Brewer
By
Attorneys.

UNITED STATES PATENT OFFICE.

CALVIN BREWER, OF TOPEKA, KANSAS.

COMBINED ANVIL, VISE, AND DRILL.

No. 895,953.  Specification of Letters Patent.  Patented Aug. 11, 1908.

Application filed September 16, 1907. Serial No. 393,164.

*To all whom it may concern:*

Be it known that I, CALVIN BREWER, a citizen of the United States, residing at Topeka, in the county of Shawnee, State of Kansas, have invented certain new and useful Improvements in a Combined Anvil, Vise, and Drill; and I do hereby declare the following to be a full, clear, and exact description of the invention, such as will enable others skilled in the art to which it appertains to make and use the same.

This invention is a machine designed for use, principally, by those employed in metal working shops where small machine parts, etc., are to be manufactured and the primary object of the invention is to provide a machine embodying a number of devices which are to be employed in performing various kinds of work. In other words I have in view the provision of a machine which may be employed in a number of different operations any one of which would necessitate the use of a separate and distinct implement or machine.

I have embodied in my machine an anvil, a vise, and a drill and have found that with the provision of these several devices, but very little work is required to be done by any other machine considering of course that the work is of ordinary character. These several elements of the machine have been so arranged that the machine is very compact and simple in its construction and the manner of arranging these elements and their construction to permit of such arrangement involves a number of features which I believe to be new in the art to which the machine relates. One of these features resides in the provision, in connection with the feed for the drill shaft and the crank for operating the shaft, of a means whereby the drill shaft and the feed may be connected for simultaneous actuation by merely turning the crank of the said shaft. This construction is very useful, as will be readily appreciated, in boring articles or parts which are made of lead or other soft metal or articles of material other than metal such as wood, bone or the like, for the reason that the boring operation may be performed much more rapidly and without the necessity of operating the drill shaft and feed separately which of course requires the employment of both hands.

Another one of the features mentioned above resides in the provision of a readily detachable work rest and a detachable pipe engaging jaw for use in conjunction with one of the vise elements or jaws of the machine.

Figure 2:
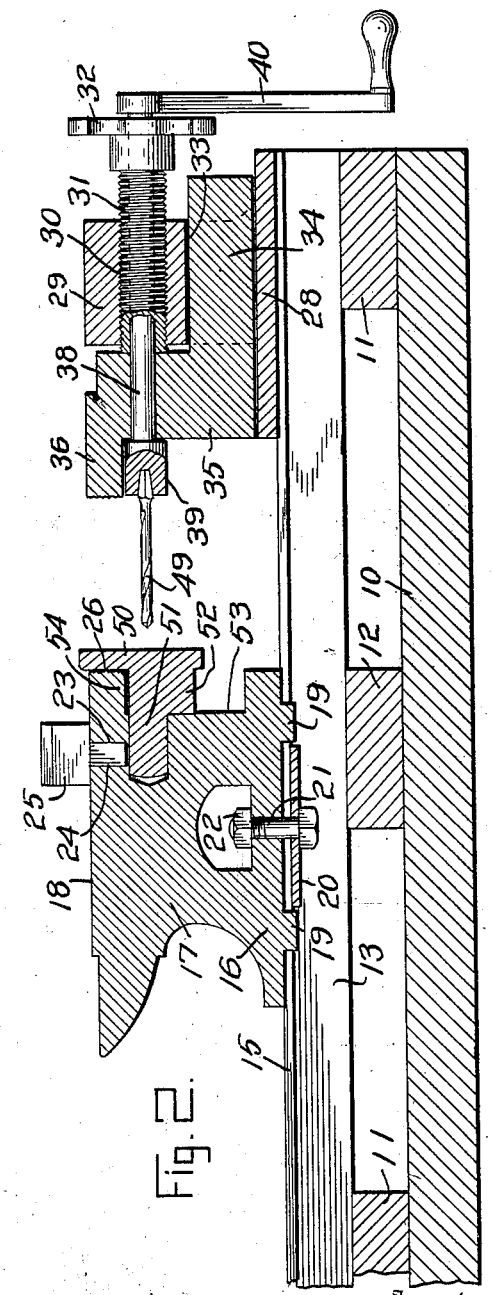

In the accompanying drawings, Figure 1 is a side elevation of the machine showing the relation of parts when the machine is used as a drill, Fig. 2 is a vertical longitudinal sectional view through the machine set up for this use, Fig. 3 is a vertical transverse sectional view taken intermediate the fixed drill shaft support or bearing and the adjustable anvil and looking in the direction of the drill shaft support, Fig. 4 is a similar view but looking in the opposite direction, Fig. 5 is a similar view but taken through the drill shaft support, Fig. 6 is a top plan view, Fig. 7 is an end view showing the manner of connecting the drill shaft and feed for simultaneous operation, Fig. 8 is a detail vertical sectional view through a portion of the anvil showing the manner of attaching the pipe holding jaw thereto, and, Fig. 9 is a vertical transverse sectional view taken substantially centrally through the anvil and showing the means for holding the anvil in adjusted position. Fig. 10 is a front elevation in detail of the pipe jaw used in connection with the machine.

As shown in the drawings, the machine comprises a base plate 10 secured upon the upper face of which at each end thereof is a cleat 11 these cleats being extended transversely of the said plate 10. Blocks 12 are also secured upon the upper face of the base plate 10 and these blocks are spaced from each other and are located intermediate the cleats 11. Secured and supported upon the cleats 11 and the blocks 12 and extending longitudinally of the base plate 10 and in parallel relation are two strips 13 which are preferably of wood and secured by means of screws 14 to each of these strips 13 is a strip 15 of bar metal which is of greater width than the corresponding strip 13 and has its inner edge, or in other words that edge which is presented in the direction of the other strip 15, extended to lie beyond the inner face of the corresponding block 13. The purpose of these strips 13 will be presently explained.

In my invention, as heretofore stated, there is embodied an anvil and this anvil is substantially identical in construction with the ordinary anvil including a base 16 and a body 17 the upper face 18 of which is flat. The under face of the base of the anvil is formed with lugs 19 which are of less width than the said base and are in fact of a width equal to the distance of the opposing inner edges of the two strips 15 and extend between said edges and serve to guide the anvil while being adjusted. A clamping plate 20 has engaged through it a bolt 21, this bolt being also engaged through the base portion 16 of the anvil and being provided with a nut 22 which may be tightened to cause the side edges of the plate to have a clamping action against the corresponding undersides of the inner edges of the strips 15, the said edges of the strips being clamped between the said edges of the plate and the under side of the anvil base. From the foregoing it will be understood that the anvil may be moved longitudinally of the base plate 10 or in other words in a line with the strips 15 and may be held at any desired adjustment. The body of the anvil is provided with an opening 23 which opens through its upper face and in which may be seated the shank 24 of a nail or wire cutting blade 25 such as is usually employed in connection with an anvil of this character, and in order that the anvil may form one jaw of a vise, one end of the body of the anvil is serrated as at 26.

A bearing is fixed upon the two strips 15 at one of their ends by means of bolts 27 which are passed through the base or attaching portion 28 of a bearing and this bearing includes an integral upstanding body 29 through which is formed a threaded bore 30 for the passage of a threaded feed sleeve shaft 31. This feed shaft is provided at its upper end with a head 32 which is approximately circular in form and which has its periphery provided with a number of concavities which form finger holds and permit of ready rotation of the feed shaft. The body 29 of the bearing afore mentioned is slotted as at 33 longitudinally in a plane below the bore 30 and slidably engaged in this slot is the shank 34 of a jaw 35 which jaw is formed with an overhanging head 36 which has one of its faces serrated and presented in opposition to the serrated end face 26 of the anvil, it being understood that the anvil and this jaw 35 form the vise of the machine in conjunction with the means for feeding the jaw 35 which means resides in the threaded feed shaft 31. This shaft 31 is held in connected relation with respect to the jaw 35 by means of a drill shaft 38 which is engaged through the said sleeve shaft 31 and has fixed to its end which opposes the anvil, a drill chuck 39, there being a crank handle 40 fixed upon the opposite end of the shaft directly outwardly of the head 32 upon the feed shaft 31.

From the foregoing description of my machine it will be understood that in order to utilize the same as a vise it is only necessary to adjust the anvil a proper distance from the shiftable jaw 35, the jaw at the time of such adjustment being moved to position against the adjacent end of the bearing 29 and after placing the article to be clamped between the said jaw and the serrated end of the anvil, to rotate the feed shaft and feed the jaw 35 in the direction of the anvil. This rotation of the shaft may be had either by grasping the head 32 or by inserting in an opening 41 provided through the said head a pin 42 against which the crank handle 40 abuts which permits of the crank handle being utilized as a means for rotating the shaft, it being understood that in this latter method of operation, a greater leverage is had and consequently the article may be more firmly clamped.

It will be understood of course that the serrated end face of the anvil and the jaw 35 are adapted only for the purpose of clamping flat work and in order that the machine may be used as a vise for clamping round work such as pipes etc., I have provided a supplemental jaw which may be readily attached to the anvil. This jaw is indicated by the numeral 43 and is formed with a V-shaped face 44 provided at its side edges with serrated portions 45 and upon the rear face of the jaw is formed a stud 46 which is to be inserted into an opening 47 formed in the end of the body of the anvil, and also with a lug 48 which, when the stud is so inserted, overlaps the upper face of the anvil body and serves to hold the said supplemental jaw firmly in proper position for use. When this jaw 43 is in proper position upon the anvil, the apex of its V will be directly in a line with the serrated face of the jaw 35 and consequently a pipe or piece of round work of any size, within reasonable limits, will be securely held within the V.

In case the machine is used as a drill, a drill bit 49 is inserted in the chuck 39 and a work rest, embodied in my invention, is applied to the anvil directly in opposition to the end of the drill. This work rest is in the form of a disk 50 formed integral with one face of which is a stud 51 formed with an integral lug 52. This stud is adapted to be inserted in the opening 47 in the anvil and the end of the lug 52 rests against the end of the anvil through which this opening is formed. This face of the anvil is undercut as is indicated at 53 to form an overhanging shoulder 54 against which the lug 52 may rest to hold the work rest 50 against turning movement. The work to be operated upon is placed against the work rest and the feed is then adjusted to bring the end or point of the bit against the work after which the drill shaft is rotated by means of the crank handle 40 and the feed shaft at the same time properly fed with the left hand. One of the principal features of the invention lies in the fact that in case the work to be operated upon is of soft lead, wood, or other soft material, the pin heretofore described is inserted in the opening in the head 32 of the feed shaft and the feed and drill shafts simultaneously rotated through the instrumentality of the crank handle. This, it will be readily understood, permits of the work being more quickly completed than if the two shafts were operated independently which of course is necessary where the work is of steel or other extremely hard metal. When not in use, this pin is to be removed from the head and inserted into a suitable opening 60 formed in one of the strips 15.

From the foregoing description of my invention it will be appreciated that I have provided a machine which is adapted to many different uses in the work shop and which, while very simple in construction and consisting of but few parts, is compact and extremely useful. It will further be understood that I do not wish to be limited to the use of a work rest and drill shaft merely in connection with drills as bits of a different nature may be used equally as well.

What is claimed, is—

In a machine of the class described, in combination, a support, a bearing fixed upon the support, a drill shaft adjustable in the bearing and rotatable therein, a member adjustable upon the support to and from the bearing, the member having its end opposing the bearing undercut to form an overhanging shoulder, and a work rest formed with a stud removably inserted in said opening and with a lug which has a bearing against the said end of the member.

In testimony whereof, I affix my signature, in presence of two witnesses.

CALVIN BREWER.

Witnesses:
HORACE C. CHANDLEE,
P. C. BARRETT.